J. WAGNER.
DRAFT APPLIANCE.
APPLICATION FILED DEC. 27, 1911.
1,052,107.
Patented Feb. 4, 1913.
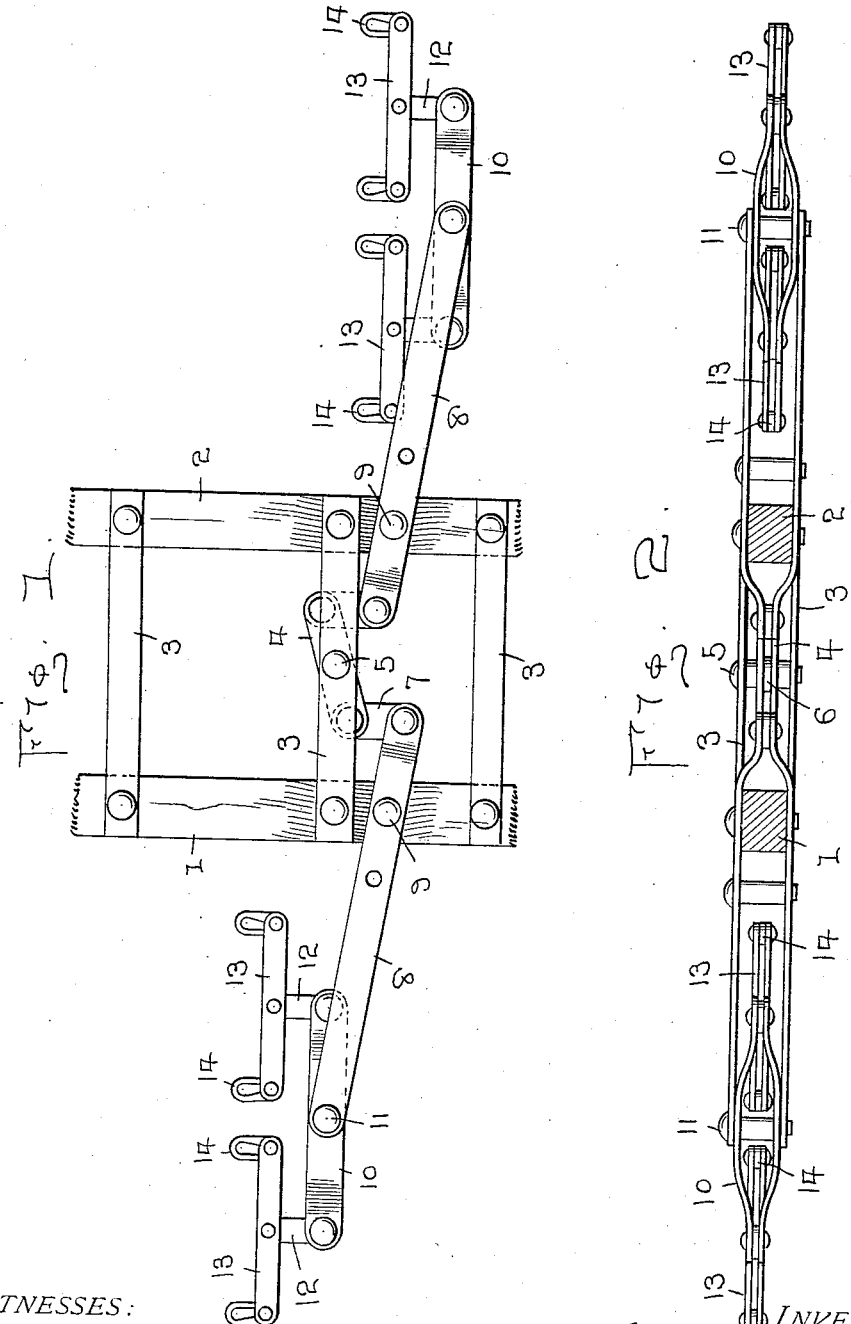

UNITED STATES PATENT OFFICE.

JOHN WAGNER, OF MOUNT VERNON, SOUTH DAKOTA.

DRAFT APPLIANCE.

1,052,107.   Specification of Letters Patent.   Patented Feb. 4, 1913.

Application filed December 27, 1911. Serial No. 668,124.

*To all whom it may concern:*

Be it known that I, JOHN WAGNER, a citizen of the United States, residing at Mount Vernon, in the county of Davison and State of South Dakota, have invented certain new and useful Improvements in Draft Appliances; and I do hereby declare the following to be a full, clear, and exact description of the invention, such as will enable others skilled in the art to which it appertains to make and use the same.

My invention relates to new and useful improvements in draft appliances and more particularly to a four horse evener.

The object of my invention is to provide a device by means of which four horses or other draft animals may be used to move a vehicle or other object and which will compensate for the faster or slower movement of the animals upon one or the other sides of the object drawn.

A further object of my invention is to centralize the pull of the draft animals upon the object to be pulled.

Other objects and advantages of my invention will be hereinafter made clearly apparent in the specification and pointed out in the claims.

In the accompanying drawings I have shown the preferred form which my invention may take.

In said drawings, Figure 1 is a top plan view, showing my improved form of draft appliance, and Fig. 2 is a rear elevation thereof.

Referring to the drawings in which similar reference numerals designate corresponding parts throughout the several views, 1 and 2 are parallel draft beams or tongues, which are to be rigidly connected to the machine or other device (not shown) to be drawn, said tongues being held in spaced relation by means of tongue-spacing plates 3, which are arranged transversely of said tongues. The tongue-spacing plates 3 are arranged in pairs, upon the respective upper and lower surfaces of said tongues 1 and 2; and pivotally secured between one of said pairs of spacing plates 3 is a lever or evener 4 extending equidistantly from each side of its pivot point 5.

In the preferred form of my invention the lever or evener 4 is composed of duplicate upper and lower members, which are held in spaced relation by means of a collar 6 surrounding the middle portion of the pivot 5. The duplicate members of the lever 4 have links 7 pivotally secured between their ends, said links being extended rearwardly and pivotally secured between the inner ends of draft levers 8. The draft levers 8 are also preferably formed of duplicate upper and lower members; the upper members being seated upon the upper surfaces of the respective tongues, and the lower members being under said tongues and directly under the respective upper members. The members duplicate of the levers 8 are pivotally secured to the tongues 1 and 2, respectively, by means of bolts 9, and the outer end portions, which are of considerably greater length than the inner end portions, are pivotally secured midway of the doubletrees 10 by means of bolts 11. The doubletrees 10 are also preferably formed of duplicate upper and lower members which are pivotally secured to, and spaced apart by the plate-links 12, an end of each plate-link being embraced between the adjacent ends of the respective upper and lower doubletrees. Swingletrees 13, which are also formed of duplicate upper and lower plates, embrace the other ends respectively, of the plate-links, between their middle portions, and are there pivoted together.

Draft hooks 14 are pivotally secured at the ends of the swingletrees 13, the free ends of said hooks being forwardly and inwardly directed and are of such shape and length as to bear upon the front edges 13 when in use. The free end of each of the hooks 14 is disposed at a greater distance from the pivoted end of said hook than the radial distance between the pivotal point thereof and the ends of said swingletrees 13, so that, when said hooks are turned out of the draft line, the free ends thereof will clear the ends of said swingletrees 13 and leave sufficient space for the passage of trace rings when it is desired to engage the same with said hooks.

My draft appliance is formed principally of heavy sheet metal and the principal sheet metal parts are spaced apart to a greater extent at their middle portions than at their ends; being symmetrically curved from their parallel middle portions to their parallel end portions, and so assembled and united as to form a combination of truss frames which are practically indestructible. Moreover, I have provided a draft appliance that can be manufactured at a comparatively low cost, since the manufacture of the principal parts consists in the ordinary and simple operations of sheet metal cutting, punching and bending, and these parts being made in duplicate, may be fitted together by unskilled workmen. It is obvious, therefore, that while I have provided a novel draft appliance which is especially applicable in connection with two spaced tongues of a vehicle, I have also combined therein maximum efficiency, durability and economy.

While I have shown the preferred form of my invention, I desire it to be understood that modifications may be made therein within the scope of the claims without departing from the spirit of my invention.

What I claim as new is:

1. The combination with a pair of spaced vehicle tongues, of duplicate spacing plates secured respectively to the upper and lower surfaces of said tongues, an evener between said spacing plates, links pivoted to the respective ends of the evener, a draft lever for each tongue, each draft lever consisting of duplicate upper and lower plates secured respectively above and below the tongue and pivoted thereto and having adjacent end portions of the upper and lower plates bent into proximity and embracing an end of said link therebetween and pivoted thereto, a double tree for each draft lever, each double tree consisting of duplicate upper and lower plates having their middle portions spaced more widely apart than their end portions and having said middle portions seated between adjacent ends of the upper and lower draft levers and pivoted thereto, a plate-link pivoted between adjacent outer ends of the upper and lower double tree plates, and a swingle tree consisting of duplicate upper and lower plates embracing an end of the plate-link therebetween and pivoted thereto.

2. The combination with a pair of spaced vehicle tongues, upper and lower spacing plates connecting the tongues, an evener pivoted between the spacing plates, draft levers consisting of duplicate upper and lower plates embracing said tongues therebetween and pivoted thereto, links pivotally connected to the evener and having an end pivoted between adjacent ends of the draft levers, double trees consisting of duplicate upper and lower plates spaced more widely apart at their middle portions than at their end portions and pivoted at their middle portions between adjacent ends of the upper and lower members of the draft lever, and swingle trees secured to the double trees by means pivoted between the adjacent ends of the double tree members.

In testimony whereof I have signed my name to this specification in the presence of two subscribing witnesses.

JOHN WAGNER.

Witnesses:
R. E. HARRIS,
J. M. NEWELL.

Copies of this patent may be obtained for five cents each, by addressing the "Commissioner of Patents, Washington, D. C."